(12) United States Patent
Welton

(10) Patent No.: US 8,207,095 B2
(45) Date of Patent: Jun. 26, 2012

(54) SCALE INHIBITING PARTICULATES

(75) Inventor: Thomas D. Welton, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 13/359,056

(22) Filed: Jan. 26, 2012

(65) Prior Publication Data

US 2012/0122741 A1 May 17, 2012

Related U.S. Application Data

(62) Division of application No. 12/608,298, filed on Oct. 29, 2009, now Pat. No. 8,138,129.

(51) Int. Cl.
*C09K 8/64* (2006.01)
*C09K 8/528* (2006.01)
*C09K 8/524* (2006.01)
*C04B 33/04* (2006.01)
*E21B 43/161* (2006.01)

(52) U.S. Cl. .......... 507/237; 507/90; 507/236; 507/238; 507/239; 166/305.1

(58) Field of Classification Search .................. 507/337, 507/90, 235, 236, 237, 238, 239; 166/305.1
See application file for complete search history.

(56) References Cited

U.S. PATENT DOCUMENTS

| 3,393,150 | A | * | 7/1968 | Ralston ......................... 210/700 |
| 5,373,901 | A | | 12/1994 | Norman et al. |
| 5,964,291 | A | | 10/1999 | Bourne et al. |
| 6,444,316 | B1 | | 9/2002 | Reddy et al. |
| 6,527,051 | B1 | | 3/2003 | Reddy et al. |
| 6,554,071 | B1 | | 4/2003 | Reddy et al. |
| 6,745,159 | B1 | | 6/2004 | Todd et al. |
| 2005/0022991 | A1 | * | 2/2005 | Rao ............................ 166/280.2 |
| 2006/0113080 | A1 | * | 6/2006 | Nguyen et al. ............. 166/308.1 |

* cited by examiner

*Primary Examiner* — Timothy J. Kugel
*Assistant Examiner* — Atnaf Admasu
(74) *Attorney, Agent, or Firm* — Robert A. Kent; McDermott Will & Emery LLP

(57) ABSTRACT

Scale inhibiting particulates formed from a mixture of fly ash and a phosphonic acid curing agent; wherein the fly ash is cured into a solid material by the contact with the phosphonic acid curing agent. The mixture may also contain a multivalent ion and the particulates may be coated with a coating material in an amount from about 0.1% to about 40% coating material by weight of the scale inhibiting particulate to delay the release of the scale inhibitor.

17 Claims, 1 Drawing Sheet

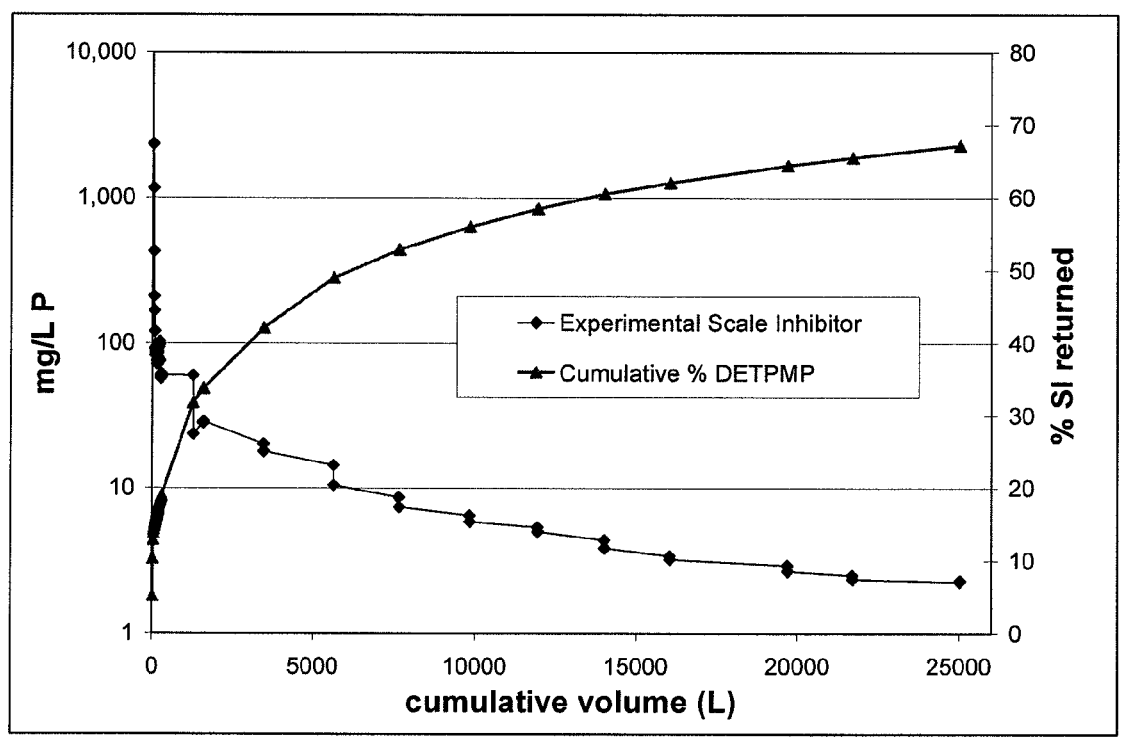

SCALE INHIBITING PARTICULATES

This application is a divisional of U.S. patent application Ser. No. 12/608,298 filed on Oct. 29, 2009, entitled "Scale Inhibiting Particulates and Methods of Using Scale Inhibiting Particulates," published as US Publication No. 2011/0105368 A1 and issued as U.S. Pat. No. 8,138,129 B2 on Mar. 20, 2012 by Thomas D. Welton.

BACKGROUND OF THE INVENTION

This invention relates to the use of particulates formed by curing fly ash with phosphonate scale inhibitors in subterranean operations.

Oilfield fluids (e.g., oil, gas, and water) are generally complex mixtures of aliphatic hydrocarbons, aromatics, heteroatomic molecules, anionic and cationic salts, acids, sands, silts, clays and a vast array of other components. The nature of these fluids combined with sometimes severe conditions of heat, pressure, and turbulence to which they are often subjected during retrieval, are contributory factors to scale formation in oil and/or gas production wells and surface equipment. Wherever water production occurs, the potential for some type of scale formation exists. Scale, as the term is used herein, refers to a mineral or solid salt deposit that forms when the saturation of formation water to one or more minerals is affected by changing physical conditions (such as temperature, pressure, or composition); thus causing minerals and salts previously in solution to precipitate into solids. Scale deposits can form on any surface in a down hole operation, including subterranean formations, production tubing, gravel packing screens, and other well bore equipment. Scale can develop almost immediately, or build up over several months before becoming noticeable. The effect scale has on productivity depends on the type, location, and the mass deposited. Scale formation can become so severe as to restrict or even completely choke production. The formation of scale can decrease permeability of the subterranean formation, reduce well productivity and shorten the lifetime of production equipment. In order to clean scale from wells and equipment it is generally necessary to stop production, which is both time-consuming and costly.

The formation of scale is often controlled by the use of scale inhibitors. Several methods are known in the art for introducing scale inhibitors into production wells. For instance, a solid form of a scale inhibitor may be placed into the formation; however, this method is limited due to the fact that there are relatively few effective solid scale inhibitors and each has functional or design limitations. Another known way to place scale inhibitor is to impregnate a porous particulate with a scale inhibitor wherein the pores are in communicate with the fluid surrounding the particulate; an example of this method can be found in U.S. Pat. No. 5,964,291 issued to Bourne et al. Methods wherein the scale inhibitor is placed onto a porous medium, such as a particulate, are limited in that they can only carry a relatively small amount of scale inhibitor. Still another known method of placing scale inhibitor is to adsorb a scale inhibitor only the surface of a particulate. Similarly to the porous particulate method, this method is limited in that they can only carry a relatively small amount of scale inhibitor. Finally, methods are known in the art to place an insoluble or sparingly soluble salt of a scale inhibitor into a subterranean formation; however, these methods may not always have the desired mechanical properties.

Oftentimes, an area of a subterranean formation where scale inhibition is desired is also an area where it is desirable to place particulates. Particulates are often used in subterranean treatment operations. For example, hydrocarbon-producing wells are often stimulated by hydraulic fracturing treatments wherein, a carrier fluid, known as a fracturing fluid, is pumped into a well bore penetrating a subterranean formation at a pressure sufficient to create or enhance one or more cracks, or "fractures," in the subterranean formation. Often, these fracturing treatments include particulates, often referred to as "proppant," that are suspended in the fracturing fluid and deposited in the fractures. The proppant particulates may function to, among other things, prevent one or more of the fractures from fully closing upon the release of hydraulic pressure, forming conductive channels through which fluids may flow to the well bore. Hydraulic fracturing operations are well known in the art.

Another subterranean operation that uses particulates is a gravel packing operation. Gravel-packing operations generally comprise placing a screen in the well bore and packing the surrounding annulus between the screen and the well bore with gravel of a specific size designed to prevent the passage of formation sand. The screen may comprise a filter assembly used to retain the gravel placed during the gravel-pack operation. A wide range of sizes and screen configurations are available to suit the characteristics of the gravel particulates used. Similarly, a wide range of sizes of gravel particulates are available to suit the characteristics of the unconsolidated particulates in the subterranean formation. To install the gravel pack, the gravel may be carried to the formation in the form of a slurry by mixing the gravel particulates with the appropriate treatment fluids. The resulting structure presents a barrier to migrating sand from the formation while still permitting fluid flow. In addition to the traditional screened gravel packing operation, screenless gravel packing operations are well known in the art. By way of example, some screenless gravel packing methods are described in U.S. Pat. No. 6,745,159, the entire disclosure of which is hereby incorporated by reference.

In some situations, hydraulic fracturing and gravel packing operations may be combined into a single treatment. Such treatments are often referred to as "frac pack" operations. In some cases, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack. Frac packing operations are well known in the art.

In some situations, the solid scale inhibitor of the present invention may be placed in the annulus, in the well bore itself, or in the rat hole of a well.

SUMMARY OF THE INVENTION

This invention relates to the use of particulates formed by curing fly ash with phosphonate scale inhibitors in down hole operations.

Some embodiments of the present invention provide methods of inhibiting scale formation in a subterranean formation comprising: forming a scale-inhibiting particulate from a mixture of fly ash and a phosphonic acid curing agent wherein the fly ash is cured into a solid material by the contact with the phosphonic acid curing agent; and, placing the solid particulates into a portion of a subterranean formation wherein the solid particulates release scale inhibitor over time when exposed to aqueous fluids.

Other embodiments of the present invention provide methods of inhibiting scale formation in a subterranean formation comprising: forming a scale-inhibiting particulate from a mixture of fly ash and a phosphonic acid curing agent wherein the fly ash is cured into a solid material by the contact with the phosphonic acid curing agent; and, suspending the solid particulates into a treatment fluid; and, placing the solid particulates to a desired location within a portion of a subterranean formation, wherein the solid particulates release scale inhibitor over time when exposed to aqueous fluids.

Still other embodiments of the present invention provide scale-inhibiting particulates formed from a mixture of fly ash and a phosphonic acid curing agent wherein the fly ash is cured into a solid material by the contact with the phosphonic acid curing agent.

Other features and advantages of the present invention will be readily apparent to those skilled in the art upon a reading of the description of preferred embodiments which follows.

DESCRIPTION OF FIGURES

FIG. 1 shows the release of inhibitor from scale-inhibiting fly-ash particulates over time in a laboratory test.

DESCRIPTION OF PREFERRED EMBODIMENTS

This invention relates to the use of scale-inhibiting particulates formed by curing fly ash with phosphonate scale inhibitors in down hole operations.

Scale-inhibiting particulates according to the present invention may be formed by combining fly ash with a phosphonic acid curing agent, pelletizing the mixture to create green (uncured) particulates, and then allowing the phosphonic acid curing agent to react with the fly ash to cure the green particulates into cured particulates suitable for use in a subterranean treatment operation.

One skilled in the art will recognize that there are many methods suitable for forming particulates from a mixture of a powder ingredient and a liquid ingredient. One example of a process capable of producing generally spherical particulates involves placing the mixture of fly ash and phosphonic acid curing agent into a high intensity mixer and then it is poured onto a slanted, rotating table as it exits the mixer. Where this method is used, the size of the particulate may be influenced by affecting the speed of the table's rotation and/or the angle of the table's slant. Another method of forming particulates suitable for use in the present invention involves combining fly ash with a phosphonic acid curing agent, allowing the two components to react and to form a solid, cured mass, then drying the mass under vacuum and grinding it into small particles. Exemplary methods of forming particulates can be found in the paper titled "Green Proppant Systems From Locally Available Low-Cost Particulates" by Ashok Santra et al. as published in 2009 by the Society of Professional Engineers (SPE 120585), the entire disclosure of which is hereby incorporated by reference.

The particular size of the final fly ash particulate may depend on the application for which the particulate materials are being used, characteristics of the subterranean formation, characteristics of the particular gelled liquid hydrocarbon treatment fluid being used, as well as other variables. Generally, the particulate sizes may vary in the range of from about 2 to about 200 mesh, U.S. Sieve Series scale. One of ordinary skill in the art with the benefit of this disclosure will be able to choose an appropriate particulate material for a given application.

Fly ash, as referred to herein, refers to a finely divided residue resulting from the combustion of carbonaceous material, such as ground or powdered coal, and generally carried by generated flue gases. One preferred type of fly ash is ASTM class F fly ash, having a Blaine fineness of about 10,585 square centimeters per gram and is commercially available from Halliburton Energy Services, Inc., of Houston, Tex., under the trade designation POZMIX®. In other embodiments of the present invention, the combustion product may comprise "bottom ash." Bottom ash, as referred to herein, refers to a finely divided residue resulting from the combustion of carbonaceous material that generally accumulates on the floor of an incinerator. Another preferred type of fly ash is a high-lime (ASTM class C) fly ash produced from combustion of low-sulfur, sub-bituminous coal that originates from at least the Powder River Basin near Gillette, Wyo. Low carbon, high calcium content and self-cementitious properties characterize this type of fly ash. Generally, ASTM class C fly ash contains more fine and less coarse particles than low-lime (ASTM class F) fly ash, is composed of 20 to 30 weight percent crystalline compounds with the remainder being amorphous, glassy materials, and comprises spherical particles having a typical particle size distribution from 1 to 150 microns diameter, but preferably particles with sizes 65 micron and larger. Regardless of the fly ash chosen, it preferably comprises substantially spherical particles.

Phosphonic acid curing agents suitable for use in the present invention include amino trimethylene phosphonic acid and derivatives thereof; bis(hexa methylene triamine penta (methylene phosphonic acid) and derivatives thereof; diethylene triamine penta(methylene phosphonic acid) and derivatives thereof; ethylene diamine tetra(methylene phosphonic acid) and derivatives thereof; hexamethylenediamine tetra(methylene phosphonic acid) and derivatives thereof; 1-hydroxy ethylidene-1,1-di acid and derivatives thereof; hexa methylene diamine tetra(methylene phosphonic acid) and derivatives thereof; 2-hydroxyphosphonocarboxylic acid and derivatives thereof; and 2-phosphonobutane-1,2,4-tricarboxylic acid and derivatives thereof; salts thereof; and mixtures thereof. Table 1, below, lists a number of the well known derivatives of these compounds along with the acronyms by which they are known in the art. Table 1 is not meant to provide a comprehensive list of suitable acid curing agents but rather to provide a list of some commonly known agents.

TABLE 1

Examples of Suitable Phosphonic Acid Curing Agents

| Acronym | Name |
| --- | --- |
| ATMP salt | Amino Trimethylene Phosphonic Acid salt |
| ATMP, NTP | Amino Trimethylene Phosphonic Acid |
| ATMP•K$x$ | Potassium salt of Amino Trimethylene Phosphonic Acid |
| ATMP•Na4 | Tetra sodium salt of Amino Trimethylene Phosphonic Acid |

TABLE 1-continued

Examples of Suitable Phosphonic Acid Curing Agents

| Acronym | Name |
| --- | --- |
| ATMP•Na5 | Penta sodium salt of Amino Trimethylene Phosphonic Acid |
| BHMTPH•PN(Na$x$) | Partially neutralized sodium salt of bis hexamethylene triamine penta (methylene phosphonic acid) |
| BHMTPMPA or BHMT | Bis(HexaMethylene Triamine Penta (Methylene Phosphonic Acid)) |
| DTPMP salt | salt of Diethylene Triamine Penta (Methylene Phosphonic Acid) |
| DTPMP•Na7 | Hepta sodium salt of Diethylene Triamine Penta (Methylene Phosphonic Acid) |
| DTPMP•Na$x$ | Sodium salt of Diethylene Triamine Penta (Methylene Phosphonic Acid) |
| DTPMPA or DETPMPA | Diethylene Triamine Penta (Methylene Phosphonic Acid) |
| EDTMP•Na5 | Pentasodium Salt of Ethylene Diamine Tetra (Methylene Phosphonic Acid) |
| EDTMPA | Ethylene Diamine Tetra (Methylene Phosphonic Acid) |
| EDTMPS | Ethylene Diamine Tetra (Methylene Phosphonic Acid) Sodium |
| HDTMP | Hexamethylenediamine tetra(methylene phosphonic acid) |
| HEDP | 1-Hydroxy Ethylidene-1,1-Diphosphonic Acid |
| HEDP•K$x$ | Potassium salt of 1-Hydroxy Ethylidene-1,1-Diphosphonic Acid |
| HEDP•Na | Monosodium of 1-Hydroxy Ethylidene-1,1-Diphosphonic Acid |
| HEDP•Na2 | Disodium of 1-Hydroxy Ethylidene-1,1-Diphosphonic Acid |
| HEDP•Na4 | Tetra sodium of 1-Hydroxy Ethylidene-1,1-Diphosphonic Acid |
| HMDTMPA | HexaMethyleneDiamineTetra (MethylenePhosphonic Acid) |
| HMDTMPA•K6 | Potassium Salt of HexaMethyleneDiamineTetra (MethylenePhosphonic Acid) |
| HPAA | 2-Hydroxyphosphonocarboxylic Acid |
| K$_6$HDTMP | Hexamethylenediamine tetra(methylene phosphonic acid) hexapotasium salt |
| PBTCA, PBTC | 2-Phosphonobutane-1,2,4-Tricarboxylic Acid |
| PBTCA•Na4 | 2-Phosphonobutane-1,2,4-Tricarboxylic Acid, Sodium salt |

Of these, bis(hexa methylene triamine penta(methylene ) [known as BMHT] and diethylene triamine penta(methylene phosphonic acid) [known as DTPMP] may be preferred.

Regardless of the method chosen to create the particulates, the phosphonic acid curing agent is generally combined with the fly ash in an amount sufficient to cause the fly ash to cure into a solid mass and not so much as to make the mixture too wet to be formed or ground into pellets. In some preferred embodiments, the phosphonic acid curing agent is added to the fly ash in an amount from about 5-200% by weight of the fly ash, preferably 25-200%, more preferably 25-100%. In addition to the above, known binders, solvents, and cements may be included in the mixture before the particulates are formed. One may also add multivalent ions such as but not limited to aluminum, antimony, barium, bismuth, boron, chromium, calcium, cobalt, copper, iron, magnesium, manganese, nickel, titanium, zinc, zirconium, or mixtures thereof. One of skill in the art with the benefit of this disclosure will be able to choose binders, solvents, and cements suitable for use in the desired particulate.

When used in subterranean treatment operations, it has been found that scale inhibiting particulates of the present invention release a phosphonic inhibitor over time when in the presence of a aqueous fluid such as water, sea water, salt water, or brine. Thus, scale inhibiting particulates according to the present invention can be used in fracturing and gravel pacing operations such that they function as proppant/gravel while simultaneously functioning to reduce the formation of scale. Such methods allow for the placement of scale inhibitor to be closely controlled and allow for the controlled release of inhibitor over time. Moreover, by placing the scale inhibitor along with a particulate placing operation rather than as a separate action, the placement of the scale inhibitor is performed without the need for additional well downtime.

In some cases it may be desirable to delay the release of the scale inhibitor from the scale inhibiting particulate. Where such delay is desired, the particulate may be encapsulated with a coating material. This encapsulating material may be optionally be degradable so that it will degrade over time in the subterranean formation where the scale inhibiting particulate is to be placed. Any material capable of acting as a temporary barrier between the fluids in the subterranean formation and the chemical carried on the particulate material and that does not undesirably interfere with the subterranean formation, the particulate, or the treating agent is suitable for use as a coating material in the present invention. Moreover, it may not be necessary for the coating material to cover 100% of the surface area of the scale inhibiting particulate. Rather, the coating material need only cover enough of the particulate's surface area to delay the release of the scale inhibitor to the desired extent. In one embodiment of the present invention, the surface area is coated to a sufficient extent as to allow the particulates to be placed in a desirable location in the subterranean formation before more than 50% of the scale inhibitor is released.

Degradable materials that may be used in conjunction with the present invention are those materials than can be coated onto the scale inhibiting particulate and that are substantially water insoluble such that they degrade over time, rather than instantaneously. Examples of suitable degradable materials include substantially water insoluble esters such as ortho esters; poly(orthoesters); aliphatic polyesters; lactides, poly (lactides); glycolides; poly(glycolides); poly(ε-caprolactone); poly(hydroxybutyrate); substantially water insoluble anhydrides; poly(anhydrides); and poly(amino acids). Polymers suitable for use as a degradable material of the present invention may be considered degradable if the degradation is due, inter alia, to chemical and/or radical process such as hydrolysis, oxidation, or enzymatic decomposition. The degradability of a polymer depends at least in part on its backbone structure, type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Blends of certain degradable materials may also be suitable as the degradable coating materials of the present invention. One example of a suitable blend of materials is a mixture of poly(lactic acid) and a poly(anhydride) where the mixing of an acid and base could result in a neutral solution where this is desirable. Another example would include a blend of poly (lactic acid) and boric oxide. Other materials that undergo an irreversible degradation may also be suitable, if the products of the degradation do not undesirably interfere with either the conductivity of the proppant matrix or with the production of any of the fluids from the subterranean formation.

In choosing the appropriate degradable material, one skilled in the art will know to consider the degradation products that will result. The degradation products should not adversely affect other operations or components. The choice of degradable material also can depend, at least in part, on the conditions of the well, e.g., wellbore temperature. For instance, lactides have been found to be suitable for lower temperature wells, including those within the range of 60° F. to 150° F., and polylactides have been found to be suitable for well bore temperatures above this range.

In some embodiments of the present invention the scale inhibiting particulate is coated with from about 0.1% to about 30% degradable coating material by weight of the particulate material. In some embodiments of the present invention, all of the scale inhibiting particulates used in the subterranean operation are coated with a degradable coating material while in other embodiments, only a portion of the scale inhibiting particulates material are coated. It is within the ability of one skilled in the art, with the benefit of this disclosure, to determine the thickness of degradable coating that should be applied to the treated particulate material and the percentage of the treated particulate material that should be coated.

The present invention is not limited to the degradable materials listed above, rather any known degradable material that may be coated onto the particulate and will degrade over time in the subterranean environment in which it is placed may be used. Examples of other suitable degradable materials include styrene-butadiene rubber latex, waxes such as low melting polyolefin waxes, oils, polybutylene and atactic polyolefins as described in U.S. Pat. Nos. 6,554,071, 6,527,051, and 6,444,316 to Reddy et al. the entire disclosure of which is hereby incorporated by reference.

Another suitable coating material is a partially hydrolized acrylic, preferably in an aqueous based form which is crosslinked with either an aziridine prepolymer or a carbodiimide as described in U.S. Pat. No. 5,373,901 to Norman et al., the relevant disclosure of which is hereby incorporated by reference. This coating material is not degradable, rather it forms a membrane having imperfections through which an aqueous fluid can diffuse, such that an aqueous fluid can diffuse through the membrane and allow for diffusion of the scale inhibitor from the particulate.

In certain embodiments, the scale inhibiting particulates of the present invention may be used in combination with traditional particulates suitable for use in fracturing or gravel packing operations. Such traditional particulate materials include, but are not limited to, graded walnut or other nut shells, resin-coated walnut or other nut shells, graded sand, resin-coated sand, sintered bauxite, various particulate ceramic materials, glass beads, various particulate polymeric materials and the like. Just as with the fly ash particulates, the particular size of the particulate material employed may depend on the particular application for which the particulate materials are being used, characteristics of the subterranean formation, characteristics of the particular gelled liquid hydrocarbon treatment fluid being used, as well as other variables. Generally, the particulate sizes may vary in the range of from about 2 to about 200 mesh, U.S. Sieve Series scale. One of ordinary skill in the art with the benefit of this disclosure will be able to choose an appropriate particulate material for a given application.

Some methods of the present comprise the steps of providing scale inhibiting particulates, suspending the particulates in a carrier fluid to create a slurry, and placing the slurry into at least a portion of a subterranean formation, and wherein the particulates to release the phosphoric acid scale inhibitor over time. In certain preferred embodiments, the particulates formed from fly ash and a phosphonic acid curing agent may be used as proppant in a fracturing operation or in a frac-packing operation. In other preferred embodiments, the particulates formed from fly ash and a phosphonic acid curing agent may be used as gravel in a gravel packing operation.

In order to further illustrate the methods and composition of the present invention, the following examples are given. In no way should such examples be read to limit or define the scope of the invention.

EXAMPLES

Fifteen grams of Grade F fly ash was mixed with 20 grams of Dequest® 2060S commercially available from Thermophos Trading GmbH in Switzerland. Dequest® 2060S contains 48-52% DETPMP as its active scale inhibiting compound. The mixture was allowed to react for about a half hour at room temperature and then was dried under vacuum for about 16 hours at $10 \times 10^{-4}$ Torr. The result was a piece of material that was then broken and ground into small particles using a mortar and pestle. The resulting particles were generally uniform and about 10/40 mesh in size. The resulting particulates included about 32.1% scale inhibitor according ICP analysis of phosphorous content. Next, 5.2 g of the fly ash/ acid particulates was mixed with 87.3 g of 12/18 Carbolite. This mixture was placed in a stainless steel column fitted with 80 mesh monel screens giving a pack length of 40.64 cm and a pack diameter of 1.22 cm. Fresh water was passed through the column at a rate of about 2 ml/min. The effluent was regularly sampled and phosphorous content was determined by ICP to calculate the concentration of inhibitor returned as presented in FIG. 1.

Thus, the present invention is well adapted to carry out the objects and attain the benefits and advantages mentioned as well as those that are inherent therein. While numerous changes to the methods and compositions can be made by those skilled in the art, such changes are encompassed within the spirit of this invention as defined by the appended claims.

What is claimed is:

1. Scale inhibiting particulates formed from a mixture of fly ash and a phosphonic acid curing agent wherein the fly ash is cured into a solid material by the contact with the phosphonic acid curing agent.

2. The scale inhibiting particulates of claim 1 wherein the fly ash comprises ASTM class F fly ash, bottom ash, high-lime fly ash, or a mixture thereof.

3. The scale inhibiting particulates of claim 1 wherein the acid curing agent comprises amino trimethylene phosphonic acid; amino trimethylene phosphonic acid derivatives; bis (hexa methylene) triamine penta (methylene phosphonic acid), bis(hexa methylene) triamine penta (methylene acid) derivatives; diethylene triamine penta (methylene acid); diethylene triamine penta (methylene phosphonic acid) derivatives; ethylene diamine tetra (methylene phosphonic acid); ethylene diamine tetra (methylene acid) derivatives; hexamethylenediamine tetra(methylene acid); hexamethylenediamine tetra (methylene phosphonic acid) derivatives; 1-hydroxy ethylidene-1,1-di acid; 1-hydroxy ethylidene-1,1-di acid derivatives; 2-hydroxyphosphonocarboxylic acid; 2-hydroxyphosphonocarboxylic acid derivatives; and 2-phosphonobutane-1,2,4-tricarboxylic acid; 2-phosphonobutane-1,2,4-tricarboxylic acid derivatives, or a mixture thereof.

4. The scale inhibiting particulates of claim 1 wherein the acid curing agent comprises bis(hexa methylene) triamine penta (methylene phosphonic acid) and diethylene triamine penta (methylene acid), or a mixture thereof.

5. The scale inhibiting particulates of claim 1 wherein the mixture of fly ash and a phosphonic acid curing agent used to form the scale-inhibiting particulates contains from about 5% to about 200 phosphonic acid curing agent by weight of the fly ash.

6. The scale inhibiting particulates of claim 1 wherein the mixture contains a multivalent ion.

7. The scale inhibiting particulates of claim 6 wherein the multivalent ion comprises aluminum, antimony, barium, bismuth, boron, chromium, calcium, cobalt, copper, iron, magnesium, manganese, nickel, titanium, zinc, zirconium, or mixtures thereof.

8. The scale inhibiting particulates of claim 1 wherein the scale-inhibiting particulate is at least partially coated with a coating material to delay the release of the scale inhibitor.

9. The scale inhibiting particulates of claim 8 wherein the material is coated onto the scale-inhibiting particulate in an amount from about 0.1% to about 40% coating material by weight of the scale-inhibiting particulate.

10. The scale inhibiting particulates of claim 8 wherein the coating material comprises an ortho ester; a poly(orthoester); an aliphatic polyester; a lactide, a poly(lactide); a glycolide; a poly(glycolide); a poly(E-caprolactone); a poly(hydroxybutyrate); a substantially water insoluble anhydride; a poly(anhydride); a poly(amino acid); partially hydrolized acrylic crosslinked with an aziridine prepolymer; partially hydrolized acrylic crosslinked with a carbodiimide or a mixture thereof.

11. Scale inhibiting particulates formed from a mixture of fly ash, a phosphonic acid curing agent, and a multivalent ion;
wherein the fly ash is cured into a solid material by the contact with the phosphonic acid curing agent;
wherein the scale-inhibiting particulate is at least partially coated with a coating material in an amount from about 0.1% to about 40% coating material by weight of the scale-inhibiting particulate to delay the release of the scale inhibitor.

12. The scale inhibiting particulates of claim 11 wherein the fly ash comprises ASTM class F fly ash, bottom ash, high-lime fly ash, or a mixture thereof.

13. The scale inhibiting particulates of claim 11 wherein the acid curing agent comprises amino trimethylene phosphonic acid; amino trimethylene phosphonic acid derivatives; bis(hexa methylene) triamine penta (methylene phosphonic acid), bis(hexa methylene) triamine penta (methylene acid) derivatives; diethylene triamine penta (methylene acid); diethylene triamine penta (methylene phosphonic acid) derivatives; ethylene diamine tetra (methylene phosphonic acid); ethylene diamine tetra (methylene acid) derivatives; hexamethylenediamine tetra(methylene acid); hexamethylenediamine tetra (methylene phosphonic acid) derivatives; 1-hydroxy ethylidene-1,1-di acid; 1-hydroxy ethylidene-1,1-di acid derivatives; 2-hydroxyphosphonocarboxylic acid; 2-hydroxyphosphonocarboxylic acid derivatives; and 2-phosphonobutane-1,2,4-tricarboxylic acid; 2-phosphonobutane-1,2,4-tricarboxylic acid derivatives, or a mixture thereof.

14. The scale inhibiting particulates of claim 11 wherein the acid curing agent comprises bis(hexa methylene) triamine penta (methylene phosphonic acid) and diethylene triamine penta (methylene acid), or a mixture thereof.

15. The scale inhibiting particulates of claim 11 wherein the mixture of fly ash and a phosphonic acid curing agent used to form the scale-inhibiting particulates contains from about 5% to about 200% phosphonic acid curing agent by weight of the fly ash.

16. The scale inhibiting particulates of claim 11 wherein the multivalent ion comprises aluminum, antimony, barium, bismuth, boron, chromium, calcium, cobalt, copper, iron, magnesium, manganese, nickel, titanium, zinc, zirconium, or mixtures thereof.

17. The scale inhibiting particulates of claim 11 wherein the material is coated onto the scale-inhibiting particulate in an amount from about 0.1% to about 40% coating material by weight of the scale-inhibiting particulate.

* * * * *